(12) United States Patent
Moretto

(10) Patent No.: US 8,021,462 B2
(45) Date of Patent: Sep. 20, 2011

(54) VARIABLE FLOW RATE DEHUMIDIFICATION PLANT AND PROCESS FOR GRANULAR MATERIALS

(75) Inventor: Renato Moretto, Padua (IT)

(73) Assignee: Moretto S.p.A., Massanzago (Padua) (IT)

( * ) Notice: Subject to any disclaimer, the term of this patent is extended or adjusted under 35 U.S.C. 154(b) by 325 days.

(21) Appl. No.: 12/153,784

(22) Filed: May 23, 2008

(65) Prior Publication Data

US 2008/0295354 A1 Dec. 4, 2008

(30) Foreign Application Priority Data

May 25, 2007 (IT) .............................. VR2007A0074

(51) Int. Cl.
*B01D 53/04* (2006.01)
(52) U.S. Cl. .................. 95/14; 95/23; 95/123; 34/473; 34/476
(58) Field of Classification Search .................. 96/109, 96/110, 112, 121; 95/14, 23, 117, 121, 122, 95/123, 148; 34/80, 443, 472, 473, 476, 34/507
See application file for complete search history.

(56) References Cited

U.S. PATENT DOCUMENTS

| | | | | |
|---|---|---|---|---|
| 3,621,585 A * | 11/1971 | Robertson | ....................... | 34/375 |
| 3,850,592 A | 11/1974 | Huffman | | |
| 4,023,940 A * | 5/1977 | Shultz | .............................. | 96/112 |
| 4,413,426 A * | 11/1983 | Graff | .............................. | 34/473 |
| 4,509,272 A * | 4/1985 | Graff | .............................. | 34/473 |
| 4,656,757 A * | 4/1987 | Oschmann | ....................... | 34/473 |
| 4,974,337 A * | 12/1990 | Tavakoli et al. | .................. | 34/471 |
| 5,546,673 A * | 8/1996 | Weagraff et al. | .................. | 34/80 |
| 5,768,897 A | 6/1998 | Rainville et al. | | |
| 5,779,768 A | 7/1998 | Anand et al. | | |
| 5,926,969 A * | 7/1999 | Crawford et al. | .................. | 34/80 |
| 6,289,606 B2 * | 9/2001 | Gillette et al. | .................. | 34/472 |
| 7,662,211 B2 * | 2/2010 | Federico | ........................... | 95/17 |

FOREIGN PATENT DOCUMENTS

| | | |
|---|---|---|
| DE | 19719483 A1 | 11/1998 |
| EP | 0416944 A | 3/1991 |
| EP | 0862937 A | 9/1998 |
| EP | 1226860 A | 7/2002 |
| EP | 1306635 A | 5/2003 |
| EP | 1316770 A | 6/2003 |
| EP | 1 475 593 A2 | 11/2004 |
| EP | 1475593 A | 11/2004 |
| JP | 60114511 A | 6/1985 |

* cited by examiner

*Primary Examiner* — Frank M Lawrence
(74) *Attorney, Agent, or Firm* — Orum & Roth LLC

(57) ABSTRACT

A dehumidification plant for granular material, comprising hopper having loading mouth and discharge mouth for granular material, upper feeding mouth in the hopper and lower delivery mouth of a gaseous medium, humidity absorbent material designed to absorb the humidity conveyed by the gaseous medium; towers arranged to contain the absorbent material; supplying arrangement designed to feed the gaseous medium to the hopper and the towers; electronic control unit; detection structure arranged to detect process variables of the plant and electrically connected with the electronic control unit. The plant further comprises distribution structure designed to distribute gaseous medium from of the towers thereby feeding it to another tower from among the towers, the distribution structure being controllable by the electronic control unit between open position, portion of the gaseous medium contained in the of the towers is fed to the towers, and closed position.

8 Claims, 1 Drawing Sheet

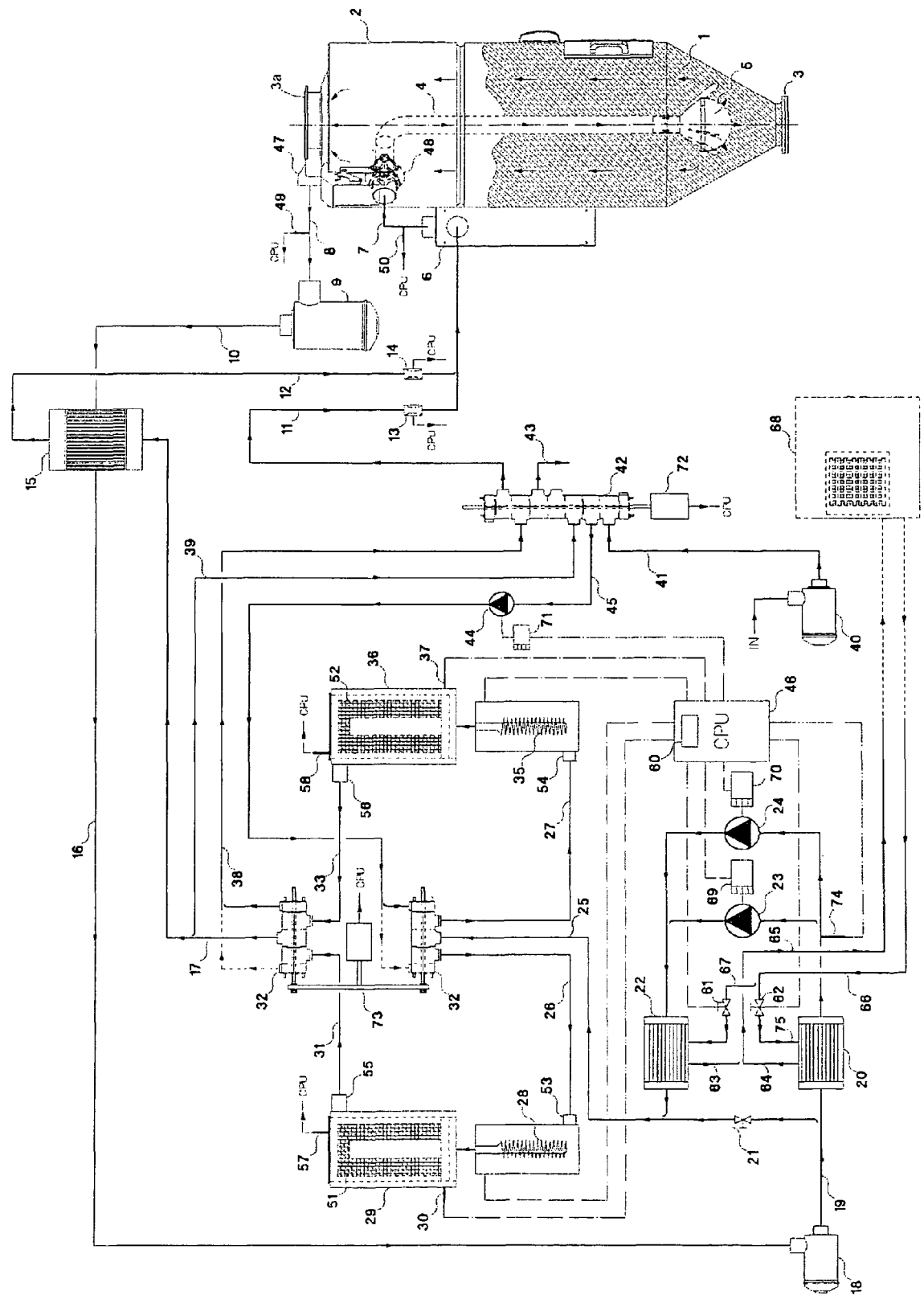

VARIABLE FLOW RATE DEHUMIDIFICATION PLANT AND PROCESS FOR GRANULAR MATERIALS

FIELD OF INVENTION

The present invention regards a dehumidification plant and process for hygroscopic materials, particularly suitable for granular materials, e.g. plastic materials.

BACKGROUND OF INVENTION

As is known, granules of polymer-based plastic materials that are used for making manufactured products or the like must be subjected to a melting process. Such granules, nevertheless, being hygroscopic, usually contain water molecules, absorbed during previous workings, which when the granules are subjected to melting can enter the molecular chains of the polymers. This leads to the formation of surface defects, blowholes and non-homogeneity both in the manufactured item's structure and color.

Many dehumidification plants were proposed up to now for granular plastic materials. The most used provide for the use of absorbent means or materials, e.g. molecular sieves, which at room temperature have good absorbent properties towards water molecules, while at much higher temperatures demonstrate a substantially opposite behavior, i.e. releasing previously absorbed water molecules.

In such plants, ambient air is made to pass through absorbent means arranged in a container known as "tower" in jargon, in which when the temperature is about 20-25° C. (room temperature), the moisture of the air is absorbed by absorbent means, such as molecular sieves, silica gel, etc. The air thus dehumidified is then suitably heated and made to pass through the granular material to be dehumidified, which gradually loses water molecules contained therein to the hot and dry air hitting it. The duration of the above described process depends on many factors, including: density, granulometry, type of granular material treated and other factors closely connected to the nature of the polymers, as well as to the characteristic features of the employed dehumidification plant.

The absorbent means proposed up to now, nevertheless, have a limited absorption capacity, and if the dehumidification process was achieved by means of a plant comprising a single tower filled with absorbent means, the process could not be continuously carried out, but would be subjected to frequent and prolonged interruptions necessary for desorbing water from the absorbent means.

In order to overcome such drawback, modern dehumidification plants normally use two towers arranged in parallel and are adjusted in a manner such that, alternately, one of the two towers is in regeneration phase, while the other is in process or dehumidification phase of an air current, which, thus dehumidified, will be fed to a hopper containing hygroscopic material. The important feature is that one obtains a continuous production of hot, dry air to be sent to the hopper.

In such plants, when the absorbent materials in the tower in processing phase are about to reach the water molecule saturation state, the operation of the two towers is reversed, by sending hot air into the saturated absorbent means in the tower that was in processing phase, so that the absorbent materials release water molecules absorbed in the preceding phase, while the air to be dehumidified is sent into the tower that was in regeneration phase, whose absorbent material is therefore substantially free of water molecules.

Such dehumidification plants, even if they allow good continuous dehumidification of the granular plastic material to be obtained, require a high amount of energy, particularly required for producing dry air intended to dehumidify the absorbent means.

SUMMARY OF THE INVENTION

The main object, therefore, of the present invention is that of providing a dehumidification plant suitable for effectively dehumidifying granular plastic material with an energy consumption less than that of the dehumidification processes proposed up to now.

Another object of the present invention is that of providing a dehumidification plant which can also be used for dehumidifying granular materials having physical-chemical characteristics that are even very different from each other.

Another object of the present invention is that of providing a regeneration process of a tower in a dehumidification plant that requires lower costs and energy consumptions than known processes.

According to a first aspect of the present invention, a granular material dehumidification plant is provided comprising at least one hopper having at least one loading mouth and one unloading mouth for granular material, at least one upper inlet mouth in the at least one hopper and at least one lower delivery mouth for a gaseous medium thereto, absorbing means designed to absorb moisture conveyed by the gaseous medium; at least two towers arranged to contain the absorbent means; supply means arranged to feed gaseous medium to said at least one hopper and said at least two towers; at least one electronic control unit; sensing means designed to detect process variables of the plant, which are electrically connected with the at least one electronic control unit, the plant comprising distribution means of gaseous medium coming from at least one of the two towers in order to feed it to at least another of the at least two towers, the distribution means being controllable by the at least one electronic control unit between at least one open position, in which at least one portion of the gaseous medium contained in at least one of the at least two towers is supplied to at least another of the at least two towers, and at least one closed position.

According to another aspect of the present invention, a regeneration process is provided for regenerating at least one tower in a granular material dehumidification plant, the process comprising the following steps in sequence:
 detecting the process variables of the plant; and
 adjusting, as a function of the detected process variables, the gaseous medium supply flow to the at least one tower.

BRIEF DESCRIPTION OF THE DRAWINGS

Further aspects and advantages of the present invention will be better appear from the following description of a preferred embodiment thereof, illustrated as merely by way of non-limiting example in the accompanying drawing, in which the single FIGURE is a schematic illustration of a dehumidification plant according to the present invention.

DETAILED DESCRIPTION OF THE PREFERRED EMBODIMENTS

With specific reference to the FIGURE in the drawing, a dehumidification plant according to the present invention comprises one or more hoppers 2, in which granular material 1 to be dehumidified by means of a gas current, e.g. air, is loaded, and two towers 29, 36, in which the moisture of the air is absorbed. The plastic granular material is dehumidified by the air, the two towers being alternately one in a processing phase (in which the tower is crossed by an air current to be dehumidified) and the other in a regeneration phase of the absorbent material contained therein, as occurs with conventional plants. Each hopper 2 comprises an upper loading mouth 3a for the granular material 1 and a lower discharge mouth 3, at which a meter or extractor device is provided (not shown in the FIGURE) of any suitable type.

At an upper zone (in use) of each hopper 2, an inlet mouth 48 is provided for hot and dry air, from which a duct 4 departs towards the interior of the hopper 2, duct 4 connecting the inlet mouth 48 with a diffuser 5, arranged in a lower zone of the hopper, a plurality of holes being provided in the diffuser through which hot and dry air is fed into the hopper and diffused in many directions, thereby hitting and thus dehumidifying any granular material descending along the hopper.

Moreover, each hopper comprises an upper air discharge mouth 47 which is in fluid communication with one end of a discharge duct 8, in which a temperature probe 49 is prearranged, electrically connected to an electronic control unit 46.

The moist and hot air exiting from the hopper through the discharge duct 8 is first caused to pass through a filter 9, then, by means of a duct 10, through a heat exchanger 15 of any suitable type, for a pre-cooling thereof, and then by means of a duct 16, through a second filter 18.

The air from the filter 18 is then further cooled through another heat exchanger 20 via a duct 19, whereby it is brought to a temperature suitable for its subsequent dehumidification, as described below.

The dehumidification plant moreover comprises pressurization or air pumping means, e.g. comprising one or more blowers 23 equipped with rotation speed variation means 69 of any suitable type, preferably of electronic type, e.g. an inverter of any suitable type, which is designed to vary the supply frequency to the motor of the blower 23, thereby modulating the air flow rate intended for the tower in processing phase. It is with such rotation speed variation means that it is possible to significantly limit the heat energy consumptions.

The suction mouth of the blower 23 is connected in fluid communication with the outlet of the heat exchanger 20, whereas its delivery side is connected to a further heat exchanger 22 designed to cool the exhaust air that is heated by the motor of the blower 23. A second blower 24 can be advantageously provided, which is arranged in parallel with the blower 23, that is intended to maintain a minimum air flow rate value. The blower 24 can function at constant rotation speed or it too can be equipped with a rotation speed variation device 70.

A bypass for the system formed by the exchangers 20 and 22 and by the blowers 23 and 24 can also be provided, such bypass comprising a duct 21 that departs from the duct 19, is in fluid communication with an air outlet duct from the exchanger 22, and is interceptable by a valve 21, whose opening/closing makes it possible to adjust the flow rate of air exiting from the filter 18 that is sent to the exchanger and blower system.

A circuit can also be advantageously provided between the two exchangers 20, 22 for automatically adjusting the refrigerant flow throughout the heat exchangers. More particularly, the refrigerant fluid is fed to the exchangers 20, 22 through respective ducts 67, 75, and discharged from the exchangers through ducts 63, 64.

The ducts 63, 64 lead to a duct 65, which conveys refrigerant liquid to an external cooling unit 68, from where the refrigerant liquid is supplied to the two exchangers via the duct 66, from which ducts 67, 75 depart. The ducts 67, 75 are preferably interceptable by a third adjusting means or valve 61, 62 of any suitable type, controllable by the electronic control unit 46.

On the suction mouth of the blowers 23, 24, a temperature probe 74 is arranged that is electrically connected to the program control unit 46, while at one portion, in use the lower portion of a tower 29, 36, a respective temperature probe 30, 37 is provided. Temperature signals detected by the probe 74 and by the temperature probes 30, 37 of the tower 29, 36 in processing phase are sent to the electronic control unit 46, which controls the adjusting valves 61, 62, thereby adjusting the flow of the liquid refrigerant circulating in the heat exchangers, in order to obtain the desired temperature for the process air flow that crosses the heat exchangers 20, 22.

The air brought to a pre-established temperature by the exchanger system 20-22 is conveyed through the duct 25 into a first air flow distribution device or second valve means 32, e.g. a slide valve actuated by a device 73 of any suitable type, e.g. a linear actuation device disclosed in the patent application IT-VR2006A000030-A in the name of the applicant of the present patent application.

One such device directs the flow into the ducts 26, 27, which alternately supply air to be dehumidified towards a respective dehumidification tower 29, 36, in each of which a respective set of absorbent materials or means 51, 52, e.g. molecular sieves, is provided. Air is inserted in the towers through an inlet mouth 53, 54 and is made to leave through an outlet mouth 55, 56. Preferably, before entering the tower 29, 36, the air is made to pass through a respective heating means 28, 35.

The dehumidification towers 29, 36 can be of any suitable type, such as with coaxial structure, e.g. as taught in EP-1 475 593.

Supposing that the tower 29 is in a processing phase, while the tower 36 is in a regeneration phase of its absorbent material 52, the air exiting from the slide valve 32 is supplied through the duct 53 into the tower 29, first passing through the heater 28, which in this phase is kept off.

At this point, the humid air from the outlet of the hopper 2 is cooled by means of the exchangers 15 and possibly 20, 22 while flowing through the absorbent material 51 which almost completely absorbs the moisture of the saturated air. The air is made to leave though the mouth 55 and is fed via the duct 31 to the slide valve 32, from where the air via the duct 17 is supplied to an exchanger 15 set to pre-heat the air to be supplied to the hopper 2.

Moreover, the dehumidification plant comprises a heater 6, designed to heat the dry air pre-heated by the heat exchanger 15 and that fed by the duct 12 coming from the refrigeration cycle (this step will be further described below). The hot, dry air from the heater 6 is supplied through the duct 7 to the duct 4 in order to be fed to the hopper 2 through the diffuser 5, as explained above. A temperature sensor 50 is arranged on the duct 7, more specifically at the inlet mouth 48, such sensor being connected to the electronic control unit 46.

A dehumidification plant according to the present invention also comprises a regeneration cycle for the absorbent material as described below with reference to the drawings.

While the dehumidification tower 29 is in a processing phase and thus the air is supplied therein for being dehumidified, the absorbent material of the other tower 36, which is connected in parallel with the tower 29, is regenerated by making hot air pass through it. Such hot air absorbs water molecules previously absorbed in the absorbent material 52 of the tower 36 in a preceding processing cycle.

Regeneration of the towers is carried out by suctioning ambient air, which is made to pass through a filter 40 and then through a duct 41 and a first valve means, e.g. a slide valve 42, from which it is conveyed to the slide valve 32 via a duct 45 intercepted by a blower 44 equipped with a rotation speed variation device 71, e.g. an inverter, as described above. From here, the air is conveyed through the duct 27 to the tower 36, being preferably pre-heated to a pre-established temperature through the heater 35, which in this phase is turned on.

Preferably, a temperature probe 37 is provided at the lower portion (in use) of the tower 36, which is arranged to send an electric signal to the electronic control unit 46. On the basis of such signal, the control unit adjusts the operating temperature of the heater 35 by means of a thermoregulation device of any suitable type (not shown in the drawings).

The air is then fed to the absorbent material 52, dehumidifying it, and then it is conveyed through the duct 33 to the slide valve 32, from where it is sent to the slide valve 42 that discharges a moisture-laden air flow into the environment through the discharge duct 43.

Due to the provision of the rotation speed variation device 71 in the blower 44, it is possible to obtain a variable air flow intended to regenerate the absorbent material 52 as a function of the granular material to be dehumidified and/or of the absorbent material bed and/or of the parameters detected by the direct and/or indirect air flow rate detection means, such as for example the temperature probes or any other suitable means.

The regeneration cycle is carried out until the absorbent material 52 in the tower 36, now in regeneration phase, is nearly completely regenerated. At that point, the absorbent material 52 is too hot to be used for dehumidifying the air exiting from the hopper 2.

In most conventional dehumidification plants, it is expected that the absorbent material in the regeneration tower is completely regenerated, in order to then cool them, in order to prepare the absorbent material for a subsequent absorption phase of the moisture of the air used to dehumidify the plastic material granules.

These two regeneration and cooling phases are separated in the conventional plants.

According to the present invention, after the absorbent material of the regeneration tower 36 was nearly completely regenerated, the slide valve 42, actuated by a control device 72 of any suitable type, e.g. the device described in the patent application IT-VR2006000030-A in the name of the applicant of the present invention, places the duct 45, intercepted by the blower 44, in fluid communication with a duct 39, which departs from the duct 17, and at the same time places the duct 38, through which the air flows that exits from the tower 36 now in regeneration phase, in fluid communication with the duct 11 that supplies the duct 12 upstream of the heater 6.

In this manner, the blower 44 no longer suctions air from the outside environment, saturated with water molecules, but rather draws it from the duct 17, into which the dry air flow from the other dehumidification tower is fed, which in this step is in processing conditions.

The amount of dry air drawn by the main duct 17 is regulated by the rotation speed adjusting device 71 of the blower 44, which in turn is controlled by the electronic control unit 46.

In such regeneration step, the heater 35 remains on until the regeneration of the absorbent means 52 of the regeneration tower 36 is completed.

Once the heater 35 is turned off, the air drawn by the duct 17, being at operating temperature and dehumidified, is designed to cool the absorbent material 52 made hot in the regeneration step. In this manner, due to the use of dehumidified air, there occurs a lower contamination of said absorbent means with respect to that which would be caused if air drawn directly from the environment is used, thus obtaining a significantly lower time interval between subsequent regeneration steps.

In this heating-cooling phase during regeneration, the heat quantity transferred to the air entering the regeneration tower 36 is controlled by the temperature sensor 37 as well as the temperature detection means 58 located in the upper part of the tower 36, which send signals to the electronic control unit 46.

Moreover, the distribution devices 42 and 32 are also adjusted by the control unit 46.

Once this cooling step has also been terminated, the actuation device 73 controls the slide valve 32 in order to start a regeneration phase in the tower 29 containing the absorbent material by now saturated, and a processing phase in the tower 36 containing the regenerated absorbent means at low temperature.

A dehumidification plant according to the present invention also comprises measuring means of the air flow rate, e.g. Venturi meter nozzles 13 and 14 equipped with a respective differential pressure sensor, in the ducts 11 and 12, respectively, (such nozzles are not shown in the drawings and can be of any suitable type, for example as illustrated and described in the patent application IT-VR2005A000128 in the name of the applicant of the present application).

The Venturi meter nozzle 13 measures the dry air flow rate in the duct 11, whereas the Venturi meter nozzle 14 measures the dry air flow rate in the duct 12, and both send a signal to the electronic control unit 46, which—also on the base on the signals received by the temperature probes 49, 50—controls the speed variation device 69 that modulates the rotation speed of the blower 23, whereby a so-called "closed ring" control is obtained between speed variator device, Venturi meters 13, 14, temperature probes 49, 50 and the electronic control unit 46, as well as the speed variator device 71 of the blower 44.

With one such device, one obtains a dry air flow rate directed to the hopper 2 as a function of the characteristics of the granular material 1 to be dehumidified, as well as a modulation of the flow rate of dry air discharged from the tower in heating and/or cooling phase. In other words, one obtains an overall flow rate of dry air entering the heater 6 given by the sum of the two flow rates of the ducts 11 and 12, thereby obtaining a much greater flexibility in the management of the overall flow rate of air intended to dehumidify the granular material 1 in the hopper 2.

The dehumidification plant of the present invention can advantageously comprise a user interface 60, which typically comprises a video unit and data insertion means, e.g. a keyboard and a mouse. Preferably, the user interface is a graphic object interface of "touch-screen" type.

Due to this user interface 60, it is possible to store in the electronic control unit 46 processing parameters and characteristics related to the materials to be dehumidified, as is described for example in the patent application IT-VR2006A000030 in the name of the applicant of the present invention.

In a first storage portion of the electronic control unit 46, a table is pre-stored, which reports a list of a first array of granular plastic materials with their respective main treatment parameters, that is provided for use in the plant; in a second storage portion, the operator will store the parameters of the materials defined as "experimental" by using the user interface 60.

Once a specific granular material to be dehumidified is selected, from among those provided in the table or among the so-called "experimental" materials with their specific parameters, the electronic control unit will calculate the air flow rate in processing phase and that in regeneration phase, sending an electric signal to the rotation speed variation devices of the air pumping or pressurization means 23, 24, 44.

If, in a plant according to the present invention, dehumidification towers are used of coaxial type, for example according to patent EP-1 475 593, the heater 6 and the heat exchanger 15 can be omitted as a function of the type of material 1 to be dehumidified.

Indeed, with the use of the coaxial towers in the plant of the present invention, any moisture-laden air, entering into the tower in processing phase, exits dehumidified and hot at a greater temperature than the entering temperature, owing to the presence of the absorbent means and to the heater arranged coaxially with the dehumidification tower. Thus, it may not be necessary to provide the plant with the heater 6 and heat exchanger 15.

It will also be noted that a plant according to the present invention can also be used for dehumidifying granular materials of plastic material that require an inert atmosphere, thereby preserving the granular material from possible oxidizing reactions. For these types of granular materials, the flow air circulating in the plant of the present invention can be substituted with inert gases, e.g. nitrogen, argon or another inert gas.

A dehumidification plant and process are described that use air as dehumidifying gas, but it will be clear for a man skilled in the art that another gas can also be used, such as nitrogen.

The invention as described above is susceptible of numerous modifications and variations within the protection scope as defined by the claims.

Thus, for example, three or more dehumidification towers can be used in parallel, to increase the performances of the plant according to the present invention.

The invention claimed is:

1. A regeneration process of at least one tower of a dehumidification plant of a granular material, comprising
    prearranging a dehumidification plant for a granular material, comprising at least one hopper having at least one loading mouth and one discharge mouth for said granular material, at least one upper feeding mouth in said at least one hopper and at least one lower delivery mouth of a gaseous medium therefrom, humidity absorbent material designed to absorb the humidity conveyed by said gaseous medium; at least two towers arranged to contain said absorbent material; supplying structure designed to feed said gaseous medium to said at least one hopper and said at least two towers; at least one electronic control unit; detection structure arranged to detect process variables of said plant and electrically connected with said at least one electronic control unit,
    said supplying structure including at least one first blower,
    said plant further including comprising distribution structure designed to distribute gaseous medium coming from at least one of said at least two towers thereby feeding it to at least another tower from among said at least two towers, said distribution structure including a second blower equipped with a rotation speed variation device,
    detecting the process variables of said plant and
    adjusting, as a function of the detected process variables, the rotation of said second blower, thereby adjusting the supply flow rate of gaseous medium to said at least one tower.

2. A process according to claim 1, comprising the following steps in sequence: detecting the process variables of said plant and adjusting, as a function of the detected process variables, the supply flow rate of gaseous medium to said at least one tower.

3. A regeneration process as claimed in claim 1, comprising:
    detecting at least one temperature signal via a temperature probe and by at least one probe located at at least one of said at least two towers; and adjusting the opening/closing of at least one adjusting valve as a function of the signals detected in said detection step, thereby obtaining a predetermined temperature for said gaseous medium to be fed to said at least two towers in processing phase.

4. A regeneration process as claimed in claim 1, comprising an adjusting step of the flow of a gaseous medium intended to regenerate said absorbent material as a function of the granular material to be dehumidified and/or type of absorbent material and/or said process variable detection structure.

5. A regeneration process as claimed in claim 1, detecting the flow rate by measuring the flow rate of said gaseous medium; detecting the temperature at said gaseous medium inlet mouth in said at least one hopper; and controlling said rotation speed variation structure as a function of the detected data.

6. A regeneration process as claimed in claim 1, wherein an emission of said gaseous medium coming from at least one of said at least two towers when in processing phase to at least one of said at least two towers in regeneration phase occurs when a heater upstream of said at least one of said at least two towers in regeneration phase is turned on.

7. A regeneration process as claimed in claim 1, wherein said distribution structure being controllable by said at least one electronic control unit between at least one open position, in which at least one portion of said gaseous medium contained in said at least one of said at least two towers is fed to said at least another of said at least two towers, and at least one closed position.

8. A regeneration process as claimed in claim 7, wherein said distribution structure comprises at least one first valve, at least one duct intended to place said first valve in fluid communication with at least one of said at least two towers, at least one duct between at least another of said at least two towers and said first valve,
    and wherein said distribution structure comprises pressurization structure for said gaseous medium, said pressurization structure of said gaseous medium comprising said at least one second blower arranged to intercept said at least one duct intended to place in fluid communication said first valve and at least one of said at least two towers, and said distribution structure comprises at least one adjusting device arranged to adjust the rotation speed of said blower.

* * * * *